United States Patent
Hayashi

(10) Patent No.: US 7,997,500 B2
(45) Date of Patent: Aug. 16, 2011

(54) DEVICE IDENTIFICATION-CODE-INFORMATION CIRCUIT AND SEMICONDUCTOR INTEGRATED CIRCUIT HAVING THE DEVICE IDENTIFICATION-CODE-INFORMATION CIRCUIT

(75) Inventor: Tomonori Hayashi, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 565 days.

(21) Appl. No.: 12/076,896

(22) Filed: Mar. 25, 2008

(65) Prior Publication Data
US 2008/0245864 A1    Oct. 9, 2008

(30) Foreign Application Priority Data
Apr. 5, 2007    (JP) ................... 2007-099194

(51) Int. Cl.
*G06K 19/06*    (2006.01)

(52) U.S. Cl. ........................................ 235/492

(58) Field of Classification Search .................. 235/492, 235/435
See application file for complete search history.

(56) References Cited

U.S. PATENT DOCUMENTS

| | | | |
|---|---|---|---|
| 5,361,364 A | 11/1994 | Nagashige et al. | |
| 5,764,654 A * | 6/1998 | Ohba et al. ................. | 714/724 |
| 6,621,283 B1 | 9/2003 | Matsuzaki et al. | |
| 6,774,655 B2 | 8/2004 | Matsuzaki et al. | |
| 2006/0151618 A1 | 7/2006 | Kwon | |

FOREIGN PATENT DOCUMENTS

| | | |
|---|---|---|
| JP | 2000-206197 A | 7/2000 |
| JP | 2001-101891 A | 4/2001 |
| JP | 2005-209230 A | 8/2005 |
| JP | 2006-196159 A | 7/2006 |

* cited by examiner

*Primary Examiner* — Seung H Lee
(74) *Attorney, Agent, or Firm* — Foley & Lardner LLP

(57) ABSTRACT

In a semiconductor integrated circuit, a device identification-code-information circuit includes an internal circuit which can set device identification code information and which can selectively read the same. This structure enables reduction in size of an LSI chip and improvement in reliability.

9 Claims, 4 Drawing Sheets

| ACTIVATION CONTROL SIGNAL | H | H | H | H | L |
|---|---|---|---|---|---|
| CODE BIT SIGNAL 1 | L | L | H | H | don't care |
| CODE BIT SIGNAL 0 | L | H | L | H | don't care |
| CODE MATCHING SIGNAL AT H | CODE 00 | CODE 01 | CODE 10 | CODE 11 | ALL Low |

| OUTPUT SWITCHING SIGNAL | L | L | H |
|---|---|---|---|
| CODE MATCHING SIGNAL | H | L | don't care |
| DATA SIGNAL | H/L | don't care | H/L |
| OUTPUT SIGNAL | H/L | Hz | H/L |

DEVICE IDENTIFICATION-CODE-INFORMATION CIRCUIT AND SEMICONDUCTOR INTEGRATED CIRCUIT HAVING THE DEVICE IDENTIFICATION-CODE-INFORMATION CIRCUIT

This application is based upon and claims the benefit of priority from Japanese patent application No. 2007-099194, filed on Apr. 5, 2007, the disclosure of which is incorporated herein in its entirety by reference.

BACKGROUND OF THE INVENTION

1. Field of the Invention

The present invention relates to a semiconductor integrated circuit, and, in particular, to a semiconductor integrated circuit including the device identification-code-information circuit for identifying a device.

2. Description of the Related Art

In a semiconductor integrated circuit, the miniaturization of a package has been advanced more and more with high integration. As the miniaturization of the package, proposals have been offered about a method for mounting a plurality of LSI chips, such as a multi-chip package and a Package on Package. The thickness of the LSI chip used for these packages is made thin, e.g., is ground to 100 μm or less. Upon mounting the miniaturized packages, a problem of the warpage of each package is caused because the thickness of the package is thin, and the mounting condition is extremely severe.

It happens that semiconductor manufacturers or makers shrink LSI chips for reducing costs and also assemble, in the same package, semiconductor integrated circuits with different chip scales and with the same function. In response to a request from a system, the semiconductor manufacturers further tend to assemble, in the same package, pin-compatibility products with different LSI chips and the same function.

Under the circumstances, since the packages are identical with one another, the appearance of such packages is the same as one another. Moreover, the LSI chips of the same functions have the same electrical characteristics because of the same functions. Thus, the products having the shrunk chip and the pin-compatibility product are undistinguishable in appearance and electricity.

However, mounting conditions of the packages with the small size are extremely severe, and optimal mounting conditions are varied upon mounting the LSI chips with different chip scales. If packages of the LSI chips with different chip scales are mixed together to manufacture the Package on Package, the warpage of each package differs depending on the chip scales. Therefore, failure takes place about the package warpage and, as a result, the chips exfoliate or peel from resin at the mounting time. This makes the mounting difficult.

As a consequence, the LSI chip (hereinafter, abbreviated as a device) comprises a device identification-code-information circuit for identifying different devices.

As device identification code information, a wide variety of information is stored which may include a product name, a chip version, a function, and a package number, and etc. By reading the device identification code information, the semiconductor integrated circuits are individually identified and the mixture of the circuits is prevented. The device identification code information can be stored within a nonvolatile storage element. As the nonvolatile storage element, a nonvolatile memory or a fuse is used.

Such a nonvolatile memory can be used when the semiconductor integrated circuit includes a nonvolatile memory area like a FLASH memory. However, the fuse is used for a volatile memory such as a DRAM and an SRAM without the nonvolatile memory, or for a general semiconductor integrated circuit.

FIG. 4 shows a flow of reading conventional device identification code information from a fuse. The device identification code information is written and stored into the fuse acting as a nonvolatile storage element, and the fuse state is read as fuse information. In response to a command signal for reading fuse information, a storage state of the fuse is output as the fuse information to a fuse peripheral circuit. The fuse peripheral circuit is activated in response to the command signal to read and output the fuse information to an input/output circuit. The input/output circuit outputs the device identification code information. Thus, by reading the device identification code information, the semiconductor integrated circuits are identified and are individually specified.

However, the fuse which is used for the semiconductor integrated circuit is free from a protective coating (polyimide film) for protecting an internal circuit. In other words, such a protective coating film is opened at the fuse. Therefore, the fuse is inferior to the internal circuit in reliability. In addition, a fuse part of the fuse circuit uses a device area for a function thereof, and the device size increases due to presence of the fuse. Obviously, test processing for sorting a wafer requires cutting of the fuse, and time for cutting the fuse is also necessary. As a consequence, investment for a facility of cutting the fuse and the test time for sorting are needed. Further, there is a problem of lowering a yield due to a cutting mistake of the fuse. Thus, using a fuse brings about an increase of costs in the semiconductor integrated circuit.

The following documents are disclosed on the device identification-code-information circuit used for the semiconductor integrated circuit. Japanese Unexamined Patent Application Publication No. 2006-196159 (Reference 1) discloses a technology in which each chip of a multi-chip package has a fuse that stores device identification information. Each chip is selected by a control signal, and the device identification information is read. Japanese Unexamined Patent Application Publication No. 2001-101891 (Reference 2) discloses a technology in which input/output buffers are switched in a normal mode and a redundancy mode.

Japanese Unexamined Patent Application Publication No. 2000-206197 (Reference 3) discloses a technology in which a normal operation mode and a terminal test mode are set with a control signal. Japanese Unexamined Patent Application Publication No. 2005-209230 (Reference 4) discloses a technology in which a peripheral-equipment control unit is equipped and low power consumption of a peripheral device is accomplished by activation-start detecting means and activation-end detecting means.

SUMMARY OF THE INVENTION

In the nonvolatile storage device, the fuse of the semiconductor integrated circuit is used as the device identification-code-information circuit. As mentioned above, the use of the fuse brings about the following problems. As a first problem, the reliability is deteriorated due to an opening of the protective coating. As a second problem, costs increase due to necessity of a fuse cutting apparatus and the investment, and running costs and costs for the time for cutting the fuse further increase. As a third problem, the loss of the device size is caused by the fuse arrangement area and a circuit arrangement forbidding area (a limitation of the design area). As a fourth problem, the yield is lowered by a fuse cutting failure.

In consideration of the problems, it is an object of the present invention to provide a device identification-code-information circuit comprising an internal circuit of a semiconductor integrated circuit, thereby solving the above-mentioned problems.

According to a first aspect of the present invention, there is obtained a semiconductor integrated circuit comprising:

a device identification-code-information circuit having a code matching signal processing circuit that receives a code bit signal and outputs a code matching signal and an output circuit that is put into an operation mode or an idle mode in accordance with the code matching signal.

According to a second aspect of the present invention, there is obtained the semiconductor integrated circuit wherein the code matching signal processing circuit comprises a circuit for outputting a plurality of code matching signals and a connection circuit which selectively connects one of the plurality of code matching signals to an input of the output circuit as device identification code information, the output circuit being put into an output mode different from each other in dependency upon whether or not the received code bit signal matches the device identification code information.

According to a third aspect of the present invention, there is obtained the semiconductor integrated circuit wherein the connection circuit is formed by a metal option of a wiring layer and is connected to the output circuit.

According to a fourth aspect of the present invention, there is obtained the semiconductor integrated circuit, wherein the code matching signal processing circuit comprises:

a decoding circuit comprising a first logic circuit that receives the code bit signal or inversion signals thereof; and a code matching output circuit comprising a second logic circuit that selects one output from the first logic circuit to produce the selected one output as an activation control signal, and the second logic circuit individually outputting the code matching signals.

According to a fifth aspect of the present invention, there is obtained the semiconductor integrated circuit, wherein the output circuit is set to an operation mode in accordance with the code matching signal from the code matching signal processing circuit when the received code bit signal matches the device identification code information, and the output circuit is set to an idle mode and high impedance is output in accordance with the code matching signal from the code matching signal processing circuit when the received code bit signal does not match the device identification code information.

According to a sixth aspect of the present invention, there is obtained the semiconductor integrated circuit, wherein the output circuit is set to the operation mode and outputs a data signal when the received code bit signal matches the device identification code information.

According to the present invention, it is possible to provide a device identification-code-information circuit with small device size having an internal circuit and a semiconductor integrated circuit having the device identification-code-information circuit.

In order to solve the above-mentioned problems, the present invention basically uses the following technology. Further, the present invention obviously also includes applied technologies that can be variously changed within the range of the technical essentials thereof.

Herein, it is to be noted that the above-mentioned References 1 to 4 do not include any descriptions regarding the problems pointed out by the invention and the technical essentials for solving the problems and that the present invention is not suggested from References 1 to 4.

A semiconductor integrated circuit according to the present invention comprises a device identification-code-information circuit comprising an internal circuit having an internal logical circuit, and device identification-code-information is read, thereby individually specifying devices. Further, the semiconductor integrated circuit comprises the internal circuit, and it is thus possible to reduce the device size, improve the reliability, and reduce costs due to the shortening of a test time.

DESCRIPTION OF THE PREFERRED EMBODIMENTS

Figure 1:
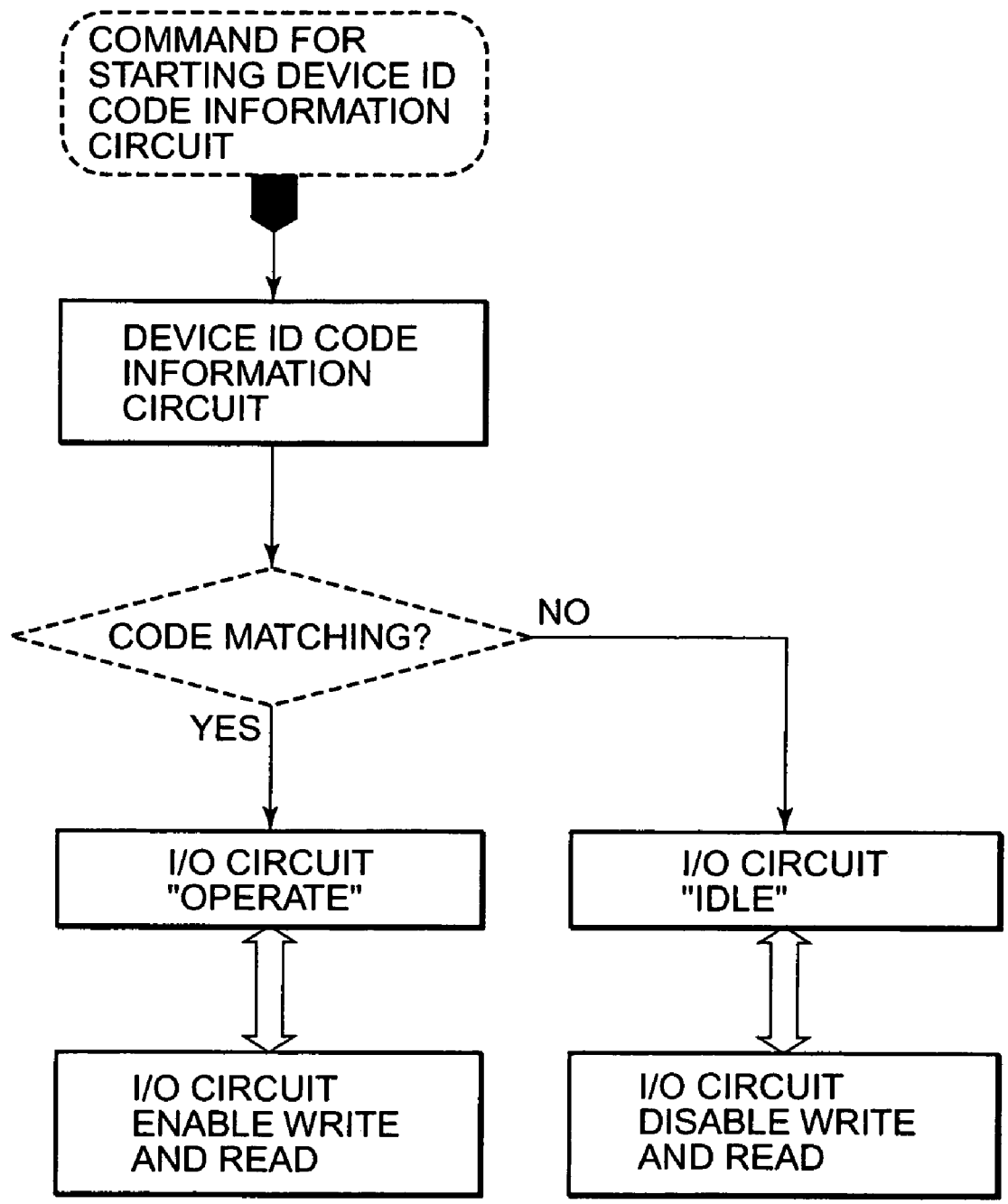
FIG. 1 is a flowchart for illustrating an identification operation of device identification code information according to the present invention.
Figures 2A, 2B:
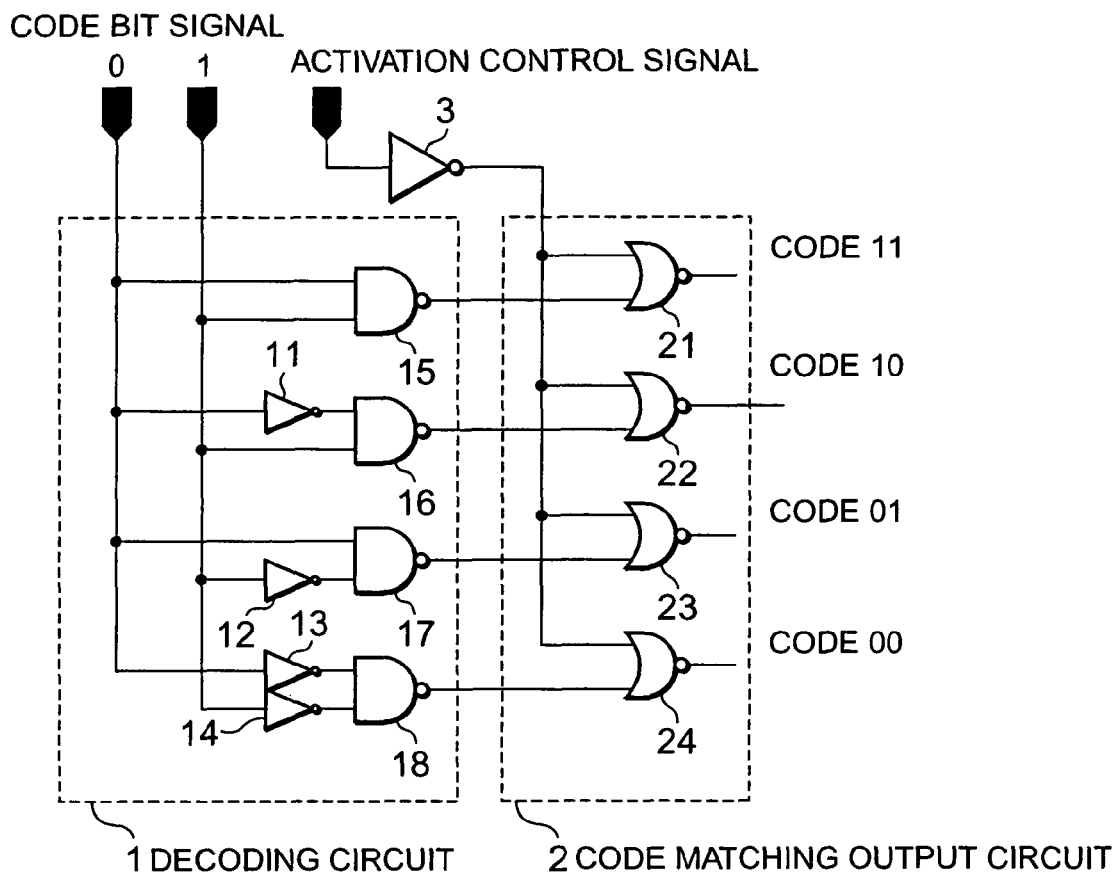
FIG. 2A is a circuit diagram showing a code matching signal processing circuit in a device identification-code-information circuit according to the present invention.
FIG. 2B is a truth table thereof.
Figures 3A, 3B:
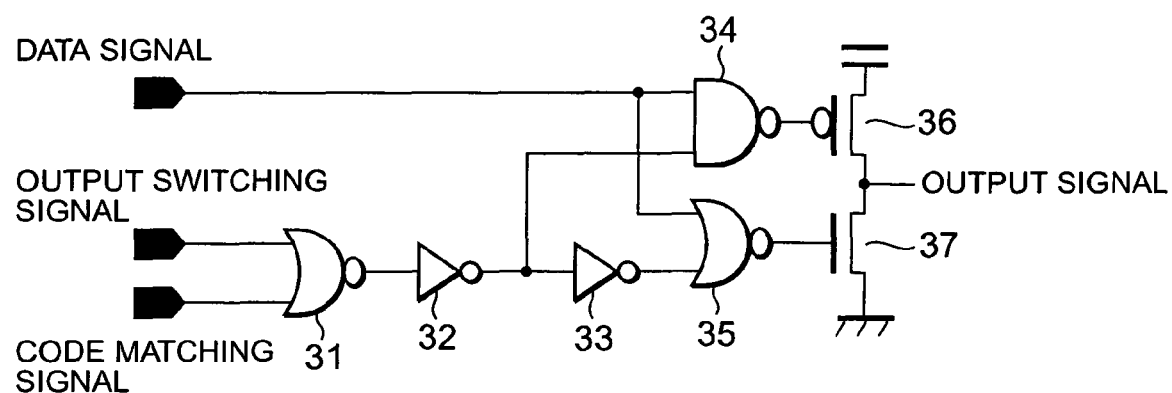
FIG. 3A is a circuit diagram showing an output circuit in the device identification-code-information circuit according to the present invention.
FIG. 3B is a truth table thereof.
Figure 4:
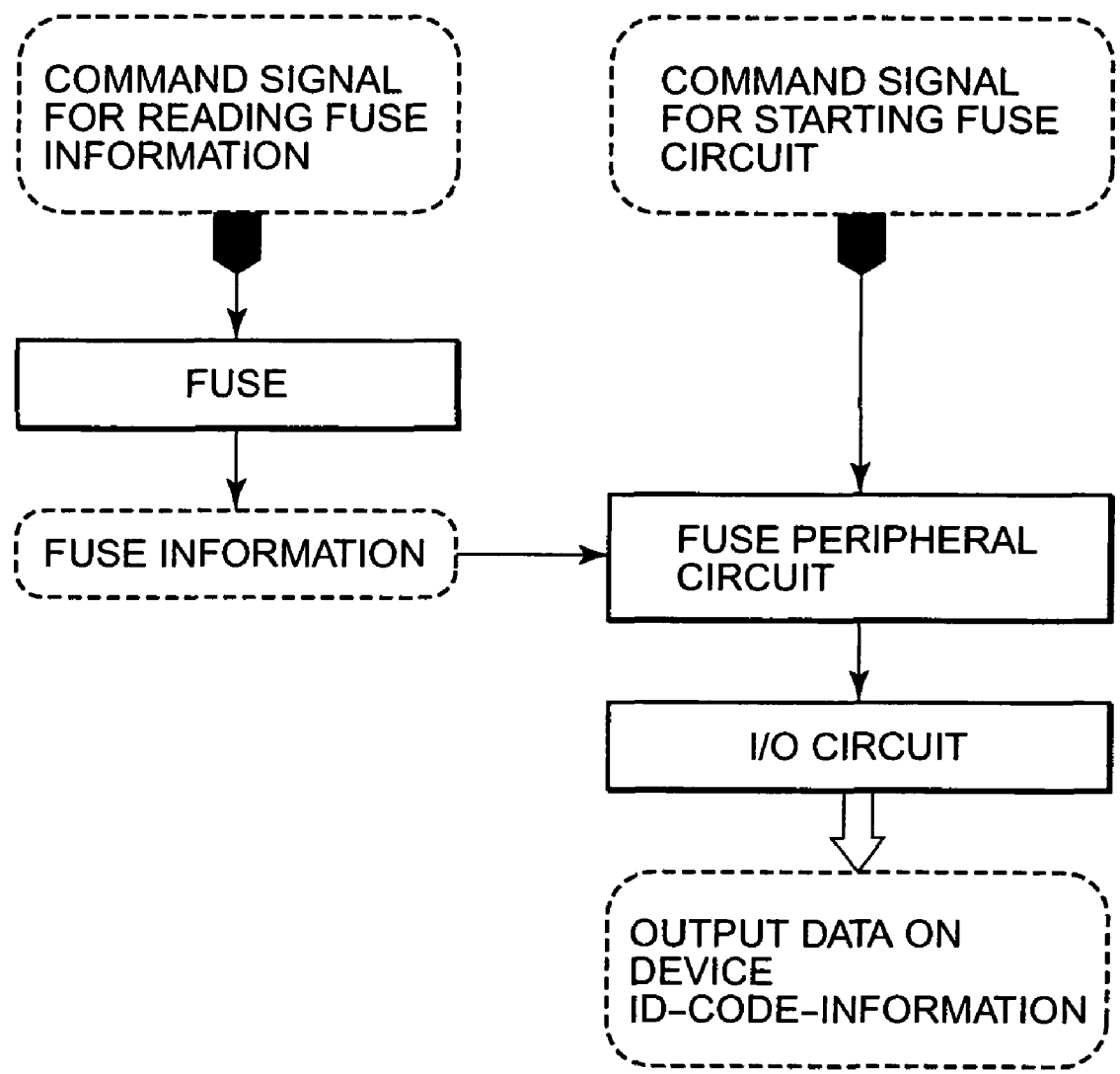
FIG. 4 is a flowchart of an identification operation of the device identification code information of a related art.

A specific description will be made about a semiconductor integrated circuit according to the present invention with reference to FIGS. 1 to 3. FIG. 1 shows a reading flowchart of device identification code information. FIG. 2A shows a circuit diagram of a code matching signal processing circuit in a device identification-code-information circuit, and FIG. 2B shows a truth table thereof. FIG. 3A shows a circuit diagram of an output circuit in the device identification-code-information circuit, and FIG. 3B shows a truth table thereof.

The semiconductor integrated circuit according to the present invention is specified by a device identification-code-information circuit which is selectively operated to output the device identification code information and which is included in the semiconductor integrated circuit.

In the reading flowchart illustrated in FIG. 1, a command is issued from a tester or the like to read the device identification code information. In response to the command, the device identification-code-information circuit is started and a code bit signal is input as a test code from a mode register or the like.

When the code bit signal matches the device identification code information, an input/output circuit is put into an operation mode. On the other hand, when the code bit signal does not match the device identification code information, the input/output circuit is put into an idle mode.

The above-mentioned operation mode of the input/output circuit represents a data input/output enabling mode that can write and read data. On the other hand, the idle mode of the input/output circuit represents a data input/output disabling mode that cannot write and read the data.

In FIG. 2A, a circuit diagram of a code matching signal processing circuit is illustrated and is included in the device identification-code-information circuit. In FIG. 3A, a circuit diagram of an output circuit is illustrated and is included in the device identification-code information circuit. FIGS. 2B and 3B show truth tables of the circuits illustrated in FIGS. 2A and 3A, respectively.

The code matching signal processing circuit shown in FIG. 2A comprises a decoding circuit 1 and a code matching output circuit 2. The decoding circuit 1 comprises inverter circuits 11, 12, 13, and 14 that invert received code bit signals 0 and 1, and NAND circuits 15, 16, 17, and 18 given, as inputs, a code bit signal 0 or its inversion signal and a code bit signal 1 or its inversion signal.

Each of the NAND circuits 15, 16, 17, and 18 that receives both input signals of high levels (hereinafter, referred to as "H") is put into a selected state and outputs a low level "L". The three remaining NAND circuits output "H". At any rate, the decoding circuit 1 is structured by a logic circuit which may be called a first logic circuit and may be realized by any other logic circuit different from the logic circuit illustrated in FIG. 2A.

The code matching output circuit 2 comprises an inverter circuit 3 that inverts an activation control signal given from the tester or the like, and NOR circuits 21, 22, 23, and 24. The NOR circuits 21, 22, 23, and 24 individually receive outputs of the inverter circuit 3 and outputs given from the decoding circuit 1. As illustrated in FIG. 2A, the code matching output circuit 2 is also formed by a logic circuit which may be called a second logic circuit and which may be structured by a logic circuit different from the logic circuit illustrated in FIG. 2A.

In FIG. 2A, an activation control signal is given from the tester to the code matching output circuit 2 through an inverter 3. When the activation control signal indicates a selection mode ("H"), the output from the decoding circuit 1 is output as a code matching output. When the activation control signal indicates a non-selection mode (at the low level), the low level (hereinafter, referred to as "L") is output as the code matching output, regardless of (set as "don't care") the code bit signal. The truth table in the code matching output circuit is shown in FIG. 2B.

The device identification code information is assigned to the device identification-code-information circuit for every device. When the code bit signal input to the device identification-code-information circuit matches the set device identification code information, "H" level is output as the code matching signal. When the code bit signal does not match the set device identification code information, "L" level is output as the code coincidence signal. When both the code bit signals 0 and 1 take "L" levels, a code matching signal "code 00" is set to "H" level. Other code matching signals "code 01", "code 10", and "code 11" are set to "L" levels. Further, the operation of the device identification-code-information circuit is controlled by the activation control signal. When the activation control signal indicates "H" level, the device identification-code-information circuit is set to a device identification operation mode. When the activation control signal indicates "L" level, the device identification-code-information circuit is independent of the code bit signal, and the device identification operation mode is invalidated.

The code matching signal output circuit 2 shown in FIG. 3A is also operated as an output circuit in a normal operation, thereby enabling the output circuit to perform the normal operation and the device identification operation. Therefore, in addition to the signal controlled by the normal operation, the output circuit has a logic circuit for processing the code matching signals shown in FIGS. 2A and 2B. An NOR circuit 31 receives the code matching signal from the code matching output circuit 2 and an output switching signal, and sends an output to an inverter circuit 32. The inverter circuit 32 sends outputs to an inverter circuit 33 (FIG. 3A) and an NAND circuit 34. The inverter circuit 33 sends an output to an NOR circuit 35.

The NAND circuit 34 receives a data signal and an output from the inverter circuit 32, and sends an output to a gate electrode of an output transistor 36. The NOR circuit 35 receives the data signal and an output from the inverter circuit 33, and sends an output to a gate electrode of an output transistor 37. A drain, a source, and the gate of the output transistor 36 are connected to a drain of the output transistor 37, a power supply, and an output of the NAND circuit 34, respectively. A drain, a source, and the gate of the output transistor 37 are connected to the drain of the output transistor 36, the ground voltage, and an output of the NOR circuit 35, respectively. Output signals are sent from the drains of the output transistors 36 and 37 connected in common.

FIG. 3B shows a truth table of the output circuit illustrated in FIG. 3A. When the output switching signal takes "H" level, the output circuit is put in the normal operation. In this normal mode, regardless of the code matching signal level, the output circuit outputs "H" or "L" in accordance with the data signal level.

On the other hand, when the output switching signal takes "L" level, the output circuit is put in the device identification operation mode of reading the device recognition code information.

Herein, if the code matching signal takes "H" level with the output switching signal kept at the "L" level, the output circuit is put in the operation mode and output "H" or "L" in accordance with the data signal level.

When the code matching signal takes "L" level, the output circuit is put in the idle mode and is also kept in a high-impedance (Hz) output mode. Thus, the code matching signal "H" serves as an activation signal of the output circuit, and the code matching signal "L" serves as a deactivation signal of the output circuit.

A description will be made about the device identification code with reference to FIGS. 2A to 3B. For example, the "code 10" is assigned as the device identification code information to one semiconductor integrated circuit. The code matching output "code 10" from the NOR circuit 22 in the code matching output circuit 2 shown in FIG. 2A is selected as the code matching signal of the NOR circuit 31 (shown in FIG. 3A) which is connected to the NOR circuit shown in FIG. 2A.

This shows that the illustrated circuit structure writes the "code 10" into the semiconductor integrated circuit. According to the present invention, a nonvolatile storage device is equivalently structured by the internal circuit, and the connection of the internal circuit is changed. Under the circumstances, the device identification code information is written into the internal circuit of the semiconductor integrated circuit.

As the circuit connection method, a switching operation is established by a metal option so that a wiring layer at the topmost layer is switched from one to another. For example, the switching operation is performed by setting, as the metal option, an input connection portion between the device matching signals "code 00" to "code 11" and the NOR circuit 31 may be formed by a metal option and the device identification code information may be selected and switched by the wiring layer at the topmost layer.

Subsequently, the code bit signals 0 and 1 are input and the activation control signal is set to "H" level. Thus, the device identification operation is performed. Upon respectively inputting "L" as the code bit signals 0 and 1, the "code 10" of the code matching output circuit 2 is kept in the non-selective mode, and the output of the NOR circuit 22 is "L". The output "L" of the NOR circuit 22 is input to the NOR circuit 31 in the output circuit.

Upon respectively inputting "L" and "H" to the code bit signals 0 and 1, the "code 10" of the code matching output circuit 2 is put in the selective mode, and the output of the NOR circuit 22 takes "H" level. The output "H" of the NOR circuit 22 is input to the NOR circuit 31 in the output circuit. When the received code bit signals 0 and 1 match the written device identification code information as mentioned above, "H" level is output. When the code bit signals 0 and 1 do not match the written device identification code information, "L" level is output.

In the output circuit, the output switching signal is set to "L" level in the identification operation mode. Under the circumstances, when the received code bit signals 0 and 1 do not match the device identification code information, both the output transistors 36 and 37 are switched-off and are kept in the high-impedance output mode (idle mode). When the code bit signals 0 and 1 match the device identification code information, the output transistors 36 and 37 output "H" or "L" level in accordance with the data signal. Since the output signals differ as mentioned above, the device in the semiconductor integrated circuit can be specified. Further, after inputting and identifying the code bit signal, test processing can also be performed as the normal operation. When the code bit signal matches the device identification code information, the data signal is output, and the test processing is therefore possible. When the code bit signal does not match the device identification code information, the output is put into a high impedance and it is judged during a test that failure takes place.

Thus, since the output signals differ in the device identification operation mode even if the appearance and the function of the semiconductor integrated circuit are the same, the device can be specified. The product of the shrunk chip and the pin-compatibility product have the same appearance and function, and the products cannot be distinguished by the appearance and inspection processing thereof. However, the device identification code is read as the identification operation at the first test or final test of the inspection processing. The individual devices can be identified because the output signals are varied when the devices are different in the identification operation.

After mounting on another device or system, the device identification information can be also determined. Instead of the idle mode of the output (outputting the high impedance) according to the embodiment, the circuit is additionally changed to fix the output to "L" or "H" level. Although four pieces of the device identification code information are used and the 2-bit code is input in the explanation, the present invention is not limited to the numbers of bits. If the number of bits and the number of decoding bits are increased, it is possible to easily increase the number of pieces of the device identification code information.

According to the present invention, the internal circuit is used as the nonvolatile storage device that stores the device identification code information. The device identification code information is stored by switching and connecting the internal circuit. With the internal circuit, it is possible to reduce the size of the device identification code information circuit, as compared with the case of using the fuse. The above-mentioned use of the internal circuit enables the reduction in device size, improvement in reliability, and reduction of test time. With the structure according to the present invention, it is possible to provide a device identification-code-information circuit with small scale and a semiconductor integrated circuit having the device identification-code-information circuit.

Although the present invention is concretely explained according to the embodiment as mentioned above, the present invention is not limited to the embodiment, various changes can be performed without departing the range of the essentials and modifications thereof can be obviously included in the present invention.

What is claimed is:

1. A semiconductor integrated circuit comprising:
   a device identification-code-information circuit having a code matching signal processing circuit that receives a code bit signal and outputs a code matching signal; and
   an output circuit that is put into an operation mode or an idle mode in accordance with the code matching signal, wherein the code matching signal processing circuit comprises a circuit for outputting a plurality of code matching signals;
   a connection circuit which selectively connects one of the plurality of code matching signals to an input of the output circuit as device identification code information;
   the output circuit being put into an output mode different from each other in dependency upon whether or not the received code bit signal matches the device identification code information.

2. The semiconductor integrated circuit according to claim 1, wherein the connection circuit is formed by a metal option of a wiring layer and is connected to the output circuit.

3. A semiconductor integrated circuit comprising:
   a device identification-code-information circuit having a code matching signal processing circuit that receives a code bit signal and outputs a code matching signal; and
   an output circuit that is put into an operation mode or an idle mode in accordance with the code matching signal, wherein the code matching signal processing circuit comprises:
   a decoding circuit comprising a first logic circuit that receives the code bit signal or inversion signals thereof;
   a code matching output circuit comprising a second logic circuit that selects one output from the first logic circuit to produce the selected one output as an activation control signal, and the second logic circuit individually outputting the code matching signals.

4. The semiconductor integrated circuit according to claim 3, wherein the output circuit is set to an operation mode in accordance with the code matching signal from the code matching signal processing circuit when the received code bit signal matches the device identification code information, and the output circuit is set to an idle mode and high impedance is output in accordance with the code matching signal from the code matching signal processing circuit when the received code bit signal does not match the device identification code information.

5. The semiconductor integrated circuit according to claim 4, wherein the output circuit is set to the operation mode and outputs a data signal when the received code bit signal matches the device identification code information.

6. A semiconductor circuit comprising:
   a first circuit receiving a code bit signal and outputting a plurality of code matching signals, a second circuit havin an input which is given a selected one of the plurality of the code matching signals as device identification code information, the second circuit outputting an output signal to an external in response to a data input signal when the received code bit signal matches the device identification code information, wherein the second circuit is set to an operation mode in accordance with the code matching signal from the first circuit when the received code bit signal matches the device identification code information, and the second circuit is set to an idle mode and high impedance is output in accordance with the code matching signal from the first circuit when the received code bit signal does not match the device identification code information.

7. The semiconductor circuit according to the claim 6, wherein the first circuit comprises:

a decoding circuit comprising a plurality of first logic circuits each of which receives the code bit signal or an inversion signal thereof and outputs an output to a code matching output circuit, the code matching output circuit comprising a plurality of second logic circuits each of which receives the output signal output from each of the first logic circuits and an activation control signal and outputs the code matching signal, and the plurality of second logic circuits outputting the code matching signals to produce the selected one of the plurality of the code matching signals as an output of the first circuit.

8. The semiconductor circuit according to the claim 7, wherein the second circuit comprises:

a third logic circuit receiving the code matching signal from the first circuit and an output switching signal and sending an output to a first inverter, the first inverter sending outputting to a second inverter and a fourth logic circuit, the second inverter sending an output to an fifth logic circuit, the fourth logic circuit receiving the data signal and the output from the first inverter and sending an output to an gate of an first output transistor, the fifth logic circuit receiving the data signal and the output from the second inverter and sending an output to an gate of a second output transistor, wherein a drain, a source, and the gate of the first output transistor are respectively connected to a drain of the second output transistor, a power source, and the output of the fourth logic circuit, a drain, a source, and the gate of the second output transistor are respectively connected to the drain of the first output transistor, a ground voltage, and the output of the fifth logic circuit, and an output is sent from the drains of the first and the second output transistors as an output of the second circuit.

9. The semiconductor circuit according to the claim 6, wherein a connection between the first circuit and the second circuit is formed by a metal option of a wiring layer.

\* \* \* \* \*